United States Patent
Potamianos et al.

Patent Number: 5,930,753
Date of Patent: Jul. 27, 1999

[54] COMBINING FREQUENCY WARPING AND SPECTRAL SHAPING IN HMM BASED SPEECH RECOGNITION

[75] Inventors: Alexandros Potamianos, Scotch Plains; Richard Cameron Rose, Watchung, both of N.J.

[73] Assignee: AT&T Corp, Middletown, N.J.

[21] Appl. No.: 08/821,349

[22] Filed: Mar. 20, 1997

[51] Int. Cl.⁶ .................................................. G10L 3/02
[52] U.S. Cl. .......................................................... 704/256
[58] Field of Search .................................. 704/243, 244, 704/250, 256

[56] References Cited

PUBLICATIONS

"An Approach to Speaker Adaptation Based on Analytic Functions" by McDonough et al., pp. 721–724 (1995).
"Maximum likelihood linear regression for speaker adaptation of continuous density hidden Markov models" by Leggetter et al., pp. 171–185 (1995).
"Unsupervised Speaker Adaptation by Probabilistic Spectrum Fitting" by Cox et al. (1989).
"N–Best–Based Instantaneous Speaker Adaptation Method for Speech Recognition" by Matsui et al., pp. 973–976 (1996).
Speaker Normalization Using Efficient Frequency Warping Procedures by Lee et al. (1996).
Rose et al. A User Configurable Ssytem for Voice Label Recognition. 582–585.
Potamianos et al. On combining freequency warping and spectral shaping in HMM based speech. 1275–1278, 1997.

*Primary Examiner*—David R. Hudspeth
*Assistant Examiner*—M. David Sofocleous

[57] ABSTRACT

Frequency warping approaches to speaker normalization have been proposed and evaluated on various speech recognition tasks. In all cases, frequency warping was found to significantly improve recognition performance by reducing the mismatch between test utterances presented to the recognizer and the speaker independent HMM model. This invention relates to a procedure which compensates utterances by simultaneously scaling the frequency axis and reshaping the spectral energy contour. This procedure is shown to reduce the error rate in a telephone based connected digit recognition task by 30%.

20 Claims, 5 Drawing Sheets

COMBINING FREQUENCY WARPING AND SPECTRAL SHAPING IN HMM BASED SPEECH RECOGNITION

FIELD OF THE INVENTION

This invention relates to speech recognition systems generally, and more particularly to a signal processing technique which combines frequency warping and spectral shaping for use in hidden Markov model-based speech recognition systems.

BACKGROUND OF THE INVENTION

Speech recognition is a process by which an unknown speech utterance (usually in the form of a digital PCM signal) is identified. Generally, speech recognition is performed by comparing the features of an unknown utterance to the features of known words or word strings.

The features of known words or word strings are determined with a process known as "training". Through training, one or more samples of known words or strings (training speech) are examined and their features (or characteristics) recorded as reference patterns (or recognition unit models) in a database of a speech recognizer. Typically, each recognition unit model represents a single known word. However, recognition unit models may represent speech of other lengths such as subwords (e.g., phones, which are the acoustic manifestation of linguistically-based phonemes). Recognition unit models may be thought of as building blocks for words and strings of words, such as phrases or sentences.

To recognize an utterance in a process known as "testing", a speech recognizer extracts features from the utterance to characterize it. The features of the unknown utterance are referred to as a test pattern. The recognizer then compares combinations of one or more recognition unit models in the database to the test pattern of the unknown utterance. A scoring technique is used to provide a relative measure of how well each combination of recognition unit models matches the test pattern. The unknown utterance is recognized as the words associated with the combination of one or more recognition unit models which most closely matches the unknown utterance.

Recognizers trained using both first and second order statistics (i.e., spectral means and variances,) of known speech samples are known as hidden Markov model (HMM) recognizers. Each recognition unit model in this type of recognizer is an N-state statistical model (an HMM) which reflects these statistics. Each state of an HMM corresponds in some sense to the statistics associated with the temporal events of samples of a known word or subword. An HMM is characterized by a state transition matrix, A (which provides a statistical description of how new states may be reached from old states), and an observation probability matrix, B (which provides a description of which spectral features are likely to be observed in a given state). Scoring a test pattern reflects the probability of the occurrence of the sequence of features of the test pattern given a particular model. Scoring across all models may be provided by efficient dynamic programming techniques, such as Viterbi scoring. The HMM or sequence thereof which indicates the highest probability of the sequence of features in the test pattern occurring identifies the test pattern.

A major hurdle in building successful speech recognition systems is non-uniformity in performance thereof across a variety of conditions. Many successful compensation and normalization techniques have been proposed in an attempt to deal with differing sources of non-uniformity in performance. Some examples of typical sources of non-uniformity in performance in telecommunications applications of speech recognition include inter-speaker, channel, environmental, and transducer variability, and various types of acoustic mismatch.

Model adaptation techniques have been used to improve the match during testing (i.e., during recognition of unknown speech) between a set of unknown utterances and the hidden Markov models (HMMs) in the recognizer database. Some model adaptation techniques involve applying a linear transformation to the HMMS. The parameters of such a linear transformation can be estimated using a maximum likelihood criterion, and then the transformation is applied to the parameters of the HMMs. A perplexing problem not heretofore solved is the existence of speakers in a population for whom speech recognition performance does not improve after model adaptation using such linear transformation techniques. This is especially true for unsupervised, single utterance-based adaptation scenarios.

It is generally thought that only those distributions in the HMMs that are likely to have been generated (during training) by the unknown utterance have a chance to be mapped more closely to the target speaker with such linear transformation model adaptation techniques. Therefore, if the "match" between the HMMs and the unknown utterance is not reasonably "good" to begin with and the number of unknown utterances is limited (such as for example in a single utterance-based adaptation scenario), then the utterance cannot "pull" the model to better match the target speaker in such conventional model adaptation techniques. Thus, there exists a subset of utterances for which model adaptation does not improve speech recognition performance.

Frequency warping for speaker normalization has been applied to telephone-based speech recognition applications. In previous testing practice, frequency warping for speaker normalization has been implemented by estimating a frequency warping function that is applied to the unknown input utterance so that the warped unknown utterance is better matched to the given HMMs. As is the case for model adaptation, there exists a subset of utterances for which frequency warping does not improve speech recognition performance.

The frequency warping approach to speaker normalization compensates mainly for inter-speaker vocal tract length variability by linear warping of the frequency axis (i.e., applying a frequency transformation to the frequency axis in the frequency domain), by a factor $\alpha$, where an $\alpha=1.00$ corresponds to no warping (no frequency transformation).

The front-end of a conventional speech recognizer processes samples of an unknown speech signal. The samples are obtained from recording windows of a specified duration (e.g., 10 ms) on the unknown speech signal, and such windows may overlap. The samples of the unknown speech signal are processed using a fast Fourier transform (FFT) component. The output of the FFT component is further processed and coupled to a mel-scale filterbank (which is also referred to as a mel-cepstrum filterbank). The mel-scale filterbank is a series of overlapping bandpass filters, wherein the bandpass filters in the series have a spacing and bandwidth which increases with frequency along the frequency axis. The output of the mel-scale filterbank is a spectral envelope. An additional transformation to the spectral envelope provides a sequence of feature vectors, X, characterizing the unknown speech signal.

In previous practice, frequency warping has been implemented in the mel-scale filterbank of the front-end of the speech recognizer by linear scaling of the spacing and bandwidth of the filters within the mel-scale filterbank. The warping factor is an index to the amount of linear scaling of the spacing and bandwidth of the filters within the mel-scale filterbank. Scaling the mel-scale filterbank in the front-end is equivalent to resampling the spectral envelope using a compressed or expanded frequency range. Changes in the spectral envelope are directly correlatable to variations in vocal tract length.

In frequency warping for speaker normalization according to previous practice, an ensemble of warping factors is made available, each being an index corresponding a particular amount of linear scaling, and thus, to a particular spacing and bandwidth of the filters within the mel-scale filterbank. For each utterance, the optimal warping factor $\hat{\alpha}$ is selected from a discrete ensemble of possible values so that the likelihood of the warped utterance is maximized with respect to a given HMM and a given transcription (i.e., a hypothesis of what the unknown speech is). The values of the warping factors in the ensemble typically vary over a range corresponding to frequency compression or expansion of approximately ten percent. The size of the ensemble is typically ten to fifteen discrete values.

Let $X^\alpha = g_\alpha(X)$ denote the sequence of cepstral observation vectors (i.e., the sequence of feature vectors), where each observation vector (i.e., each feature vector) is warped by the function $g_\alpha(\ )$, and the warping is assumed to be linear. If $\lambda$ denotes the set of HMMs and the parameters thereof, the optimal warping factor is defined as:

$$\hat{\alpha} = \underset{\alpha}{\mathrm{argmax}}\, P(X^\alpha \mid \alpha, \lambda, H) \qquad (1)$$

where H is the transcription (i.e., a decoded string) obtained from an initial recognition pass using the unwarped sequence of feature vectors X. This frequency warping technique is computationally efficient since maximizing the likelihood in Eq. 1 involves only the forced probabilistic alignment of the warped observation vectors $X^\alpha$ to a single string H. Finally, the frequency-warped sequence of feature vectors $X^\alpha$ is used in a second recognition pass to obtain the final recognized string.

Frequency warping for speaker normalization according to previous practice transforms an utterance according to a parametric transformation, $g_\alpha(\ )$, in order to maximize the likelihood criterion given in Eq. 1.

There is a large class of maximum likelihood-based model adaptation procedures that can be described as parametric transformations of the HMMs. For these procedures, let $\lambda_\gamma = h_\gamma(\lambda)$ denote the models obtained by a parametric linear transformation $h_\gamma(\ )$ of the original set of HMMs and parameters thereof. The form of the parametric linear transformation can depend on the nature of the sources of non-uniformity in speech recognition performance and the number of observations (i.e., the sequence of feature vectors) available for estimating the parameters of the transformation.

A maximum likelihood criterion similar to that used for estimating α is used for estimating γ:

$$\hat{\gamma} = \underset{\gamma}{\mathrm{argmax}}\, P(X \mid \gamma, \lambda_\gamma, H) \qquad (2)$$

The article by McDonough et al. entitled "An Approach To Speaker Adaptation Based On Analytic Functions", *Proc. Intl. Conf. on Acoustics, Speech and Signal Processing,* Atlanta, Ga., May 1996, pages 721–724, suggests that in an HMM-based speech recognition system the effect of frequency warping for speaker normalization is equivalent to that obtained from either a linear transformation applied to the cepstral feature space or a linear transformation applied to the means of the HMMs. In view of that reference, frequency warping for speaker normalization and a linear transformation in the cepstral feature space are the same, and would therefore have equivalent effects. McDonough et al. teaches that combining frequency warping for speaker normalization and a linear transformation in the cepstral feature space are redundant.

SUMMARY OF THE INVENTION

We have discovered that the ineffectiveness of frequency warping for speaker normalization for a particular subset of utterances is due to the interaction of various sources of variability in speech recognition performance in the process of estimating the "best" warping function. If both model adaptation and frequency warping for speaker normalization are limited by the initial relationship between the HMMs and the input utterance, then the solution to this problem is to search for an optimal warping function and an optimal model transformation in the same procedure.

Since a spoken utterance may be simultaneously affected by many sources of speech recognition performance variability, and since there may be many acoustic correlates associated with a given source of variability, it is important that different procedures for compensating for acoustic distortions be tightly coupled with one another. According to the principles of the invention, linear model transformation and frequency warping are implemented as a single combined procedure in an HMM-based speech recognition system to compensate for these sources of speech recognition performance variability.

In an illustrative embodiment of the invention, unknown speech in the form of sound waves is received by an acoustic transducer and is converted into an electrical unknown speech signal. An optimally warped sequence of feature vectors is determined which characterizes the unknown speech signal, each of the feature vectors in the sequence being warped according to an optimal warping factor. Recognition unit models stored in a memory are adapted to the unknown speech signal. A plurality of the adapted recognition unit models is compared with the optimally warped sequence of feature vectors to determine a comparison score for each such model. The highest comparison score is selected and the unknown speech is recognized based on the highest score.

Combining frequency warping of the cepstrum observation sequence and linear transformation of the recognition unit models improves speech recognition performance substantially more than when using either of these techniques alone, contrary to the teachings of "An Approach To Speaker Adaptation Based On Analytic Functions" by McDonough et al. The combined procedure according to the principles of the invention successfully compensates for mismatches between speaker populations used for training and speaker populations encountered during testing in HMM-based speech recognition.

Other aspects and advantages of the invention will become apparent from the following detailed description and accompanying drawing, illustrating by way of example the features of the invention.

DETAILED DESCRIPTION OF THE PREFERRED EMBODIMENTS

Figure 1:
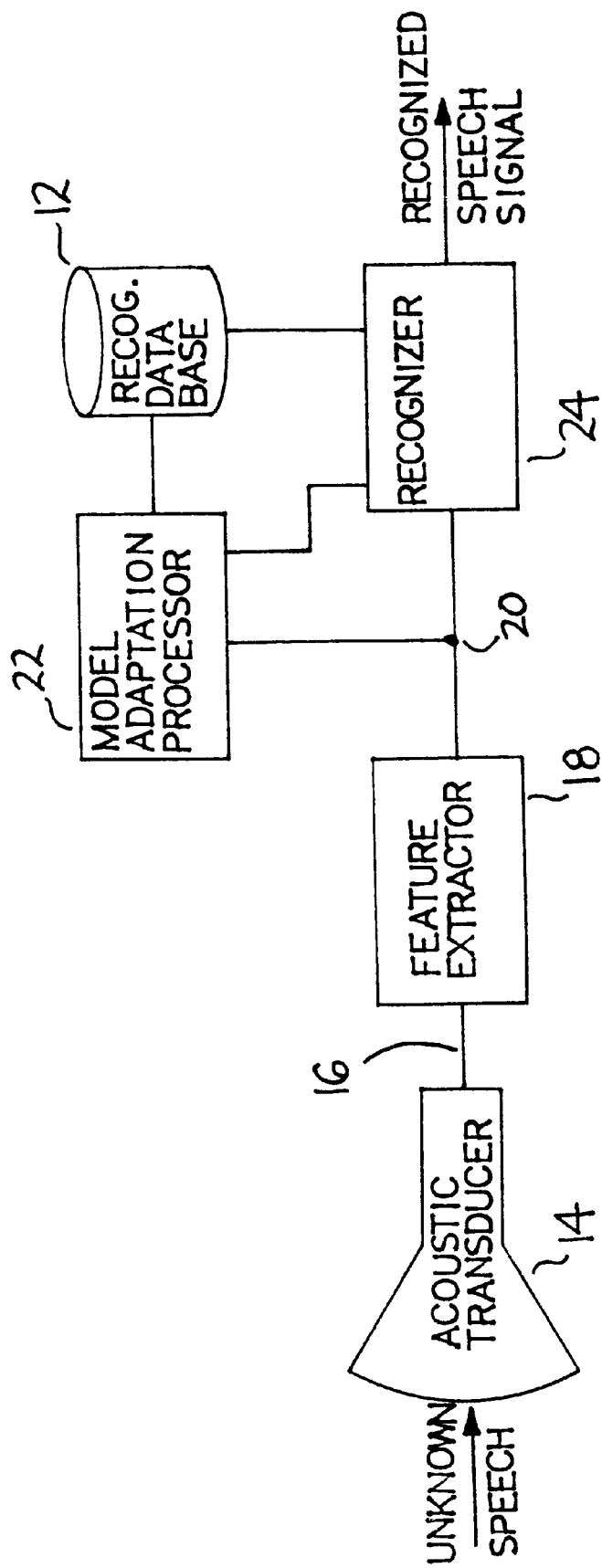
FIG. 1 is a schematic view of a speech recognition system in accordance with the principles of the invention.

For a better understanding of the invention, together with other and further objects, advantages, and capabilities thereof, reference is made to the following disclosure and the figures of the drawing, where like reference characters designate like or similar elements.

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. For example, the functions of processors presented in the figures of the drawing may be provided by a single shared processor. (Use of the term "processor" should not be construed to refer exclusively to hardware capable of executing software.) Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Use of DSPs is advantageous since the signals processed represent real physical signals and processes, such as speech signals, room background noise, etc.

Combining a parametric linear transformation of the recognition unit models and a parametric frequency warping of the features extracted from the unknown input utterance in the telephone-based speech recognition system according to the principles of the invention expands the ensemble of alternatives evaluated during model adaptation to obtain a better match between the input utterance and the recognition unit models.

Figure 2:
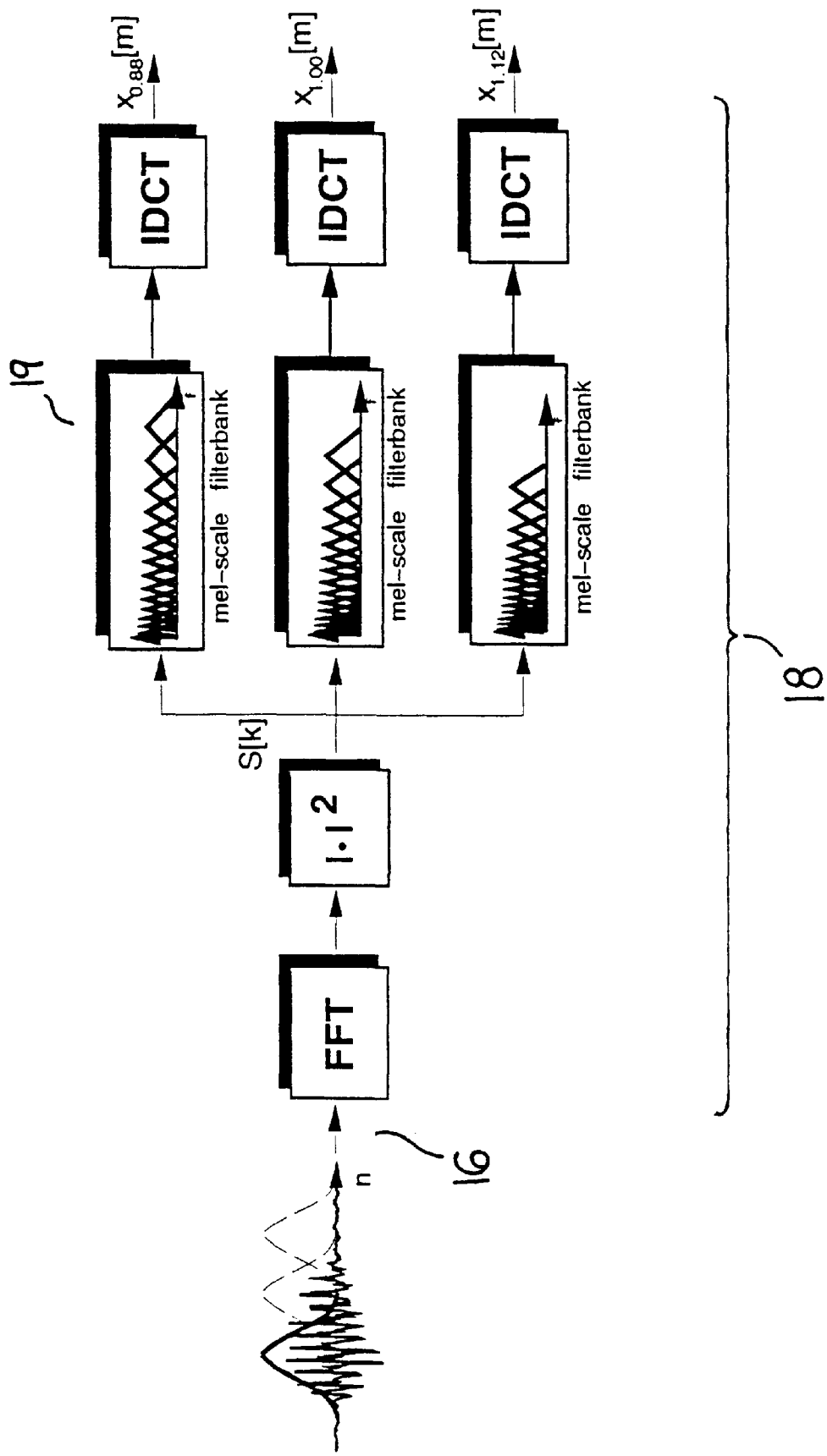
FIG. 2 is a schematic view of a bank of mel-scale filterbanks for use in the speech recognition system depicted in FIG. 1.

Referring to FIG. 1, a speech recognition system according to the principles of the invention includes a recognition database 12 for storing recognition unit models which comprise one or more HMMs and HMM parameters associated therewith. Each of the one or more HMMs includes one or more (e.g., eight) Gaussian distributions per state, each Gaussian distribution having a mean and a variance (which are referred to as model parameters). The speech recognition system shown in FIG. 1 includes an acoustic transducer 14, such as a microphone in the handset of a telephone, for receiving audible sound waves representing unknown speech caused by expansion and rarefication of molecules of air with associated impurities. The acoustic transducer 14 converts the sound waves into electrical unknown speech signals 16. A feature extractor 18 is in electrical connection with the electrical signal output 16 of the acoustic transducer 14. Referring to FIG. 2, the feature extractor 18 comprises, at least in part, a bank of K mel-scale filterbanks 19, K being an integer. Each of the bank of mel-scale filterbanks is associated with a warping factor $\alpha$ in a range from 0.88 to 1.12 and corresponds to an amount of frequency transformation in the frequency domain. A warping factor of 1.00 means no frequency transformation to the spacing and bandwidth of the filters within the mel-scale filter. Referring to FIG. 1, the feature extractor 18 identifies an optimally warped sequence of feature vectors 20 best characterizing the electrical unknown speech signal 16. A model adaptation processor 22 is coupled to the recognition database 12, the feature extractor 18, and a recognizer 24. The recognizer 24 is coupled to the recognition database 12. In an illustrative embodiment of the invention, the model adaptation processor 22 adapts the parameters of the HMMs (i.e., the means and/or variances of the Gaussian distributions) stored in the recognition database 12 to the unknown speech signal 16 by applying a linear transformation to the means of the Gaussian distributions of the HMMs based on the sequence of feature vectors 20 and output from the recognizer 24. The recognizer 24 compares a plurality of the adapted HMMs with the warped sequence of feature vectors 20 to determine a comparison score for each such model, selects the highest comparison score, and generates a recognized speech signal based on the highest score.

Speech recognition performance is improved according to the principles of the invention by combining frequency warping and model adaptation and jointly optimizing the parameters of frequency warping and model adaptation in a maximum likelihood framework. The optimal parameters of the model transformation $\hat{\gamma}$ and the frequency warping $\hat{\alpha}$ can be simultaneously estimated so that:

$$\{\hat{\alpha}, \hat{\gamma}\} = \underset{\{\alpha,\gamma\}}{\operatorname{argmax}} P(X^\alpha \mid \alpha, \gamma, \lambda_\gamma, H) \qquad (3)$$

The combined optimization procedure is described by Eq. 3. In view of Eq. 3, $h_\gamma(\ )$ is a set of transformations applied to the means of the recognition unit model distributions or, as described subsequently, to the observation sequence in the context of speaker adaptation from single utterances in the exemplary speech recognition system.

A computationally efficient implementation of the combined optimization procedure can be used for simple definitions of the model transformation, $h_\gamma(\ )$. If the model transformation corresponds to a single fixed (i.e., data independent) transformation applied to all the HMM means, then it can be applied to the observation sequence 20 (FIG. 1) instead of the HMMs; in that case, however, the inverse of the transformation is applied to the sequence of observations 20. Herein, for simplicity, the same notation is used to describe transformations applied to either the sequence of cepstral observations (i.e., the sequence of feature vectors 20) or to the HMMs stored in the recognition database 12.

Frequency warping is applied by feature extractor 18 directly on the cepstral observation sequence during testing. This simplifies significantly both the computational load and the memory requirements of the combined frequency warping and model adaptation procedure taught herein.

Single utterance-based adaptation experiments were performed on a connected digit speech corpus that was collected over the public switched telephone network. In such adaptation experiments, the combined process included linear frequency warping of the sequence of feature vectors followed by a single linear bias applied to such warped sequence of feature vectors. Such combined process can be described as follows:

$$h_\gamma(X^\alpha(t)) = X^\alpha(t) - \gamma, \quad (4)$$

where $X^\alpha(t)$ is the cepstrum feature vector at time instant t warped by the warping function $g_\alpha(\ )$.

To estimate the optimal model adaptation parameter, which in this specific example is a single linear bias $\gamma$ applied to the warped sequence of feature vectors, it was assumed that only the highest scoring Gaussian in the mixture contributes to the likelihood computation. The estimate is thus simplified as follows:

$$\hat{\gamma} = \left(\sum_t (X^\alpha(t) - \mu_j(t))/\sigma_j(t)\right) / \left(\sum_t 1/\sigma_j(t)\right) \quad (5)$$

where $\mu_j(t)$ and $\sigma_j(t)$ are the mean and variance of the most active Gaussian j in the mixture at time instant t.

Figure 3:
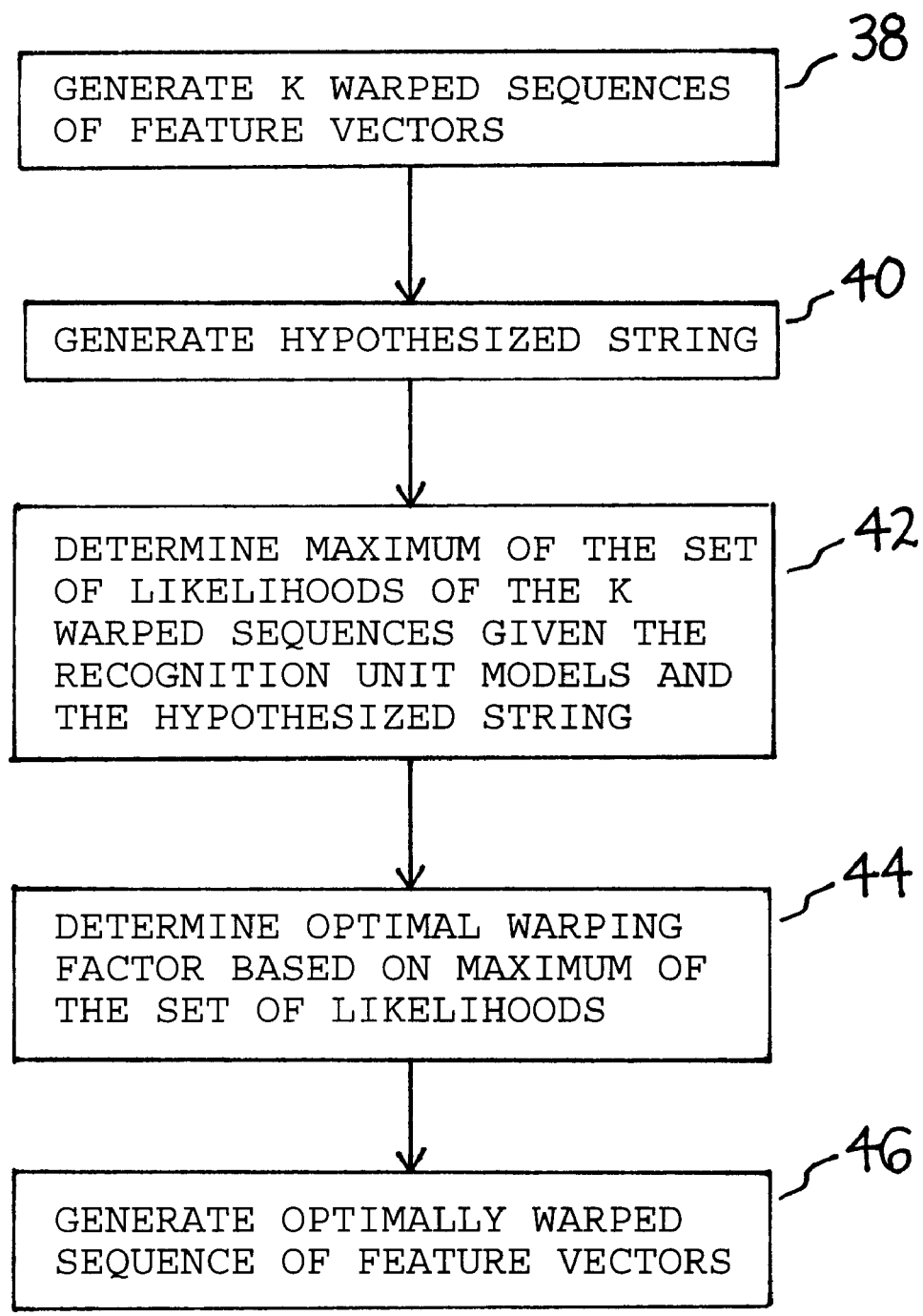
FIG. 3 is a flow diagram for describing frequency warping in accordance with the principles of the invention.

An exemplary frequency warping technique which can be implemented in the feature extractor is illustrated by the flow diagram of FIG. 3. K warped sequences of feature vectors are generated in step 38, wherein the K warped sequences are each warped by a warping factor, $\alpha$, which is in a range from 0.88 to 1.12, where a warping factor of 1.00 corresponds to no warping. Warping corresponds to a frequency transformation of the frequency axis in the mel-scale filterbank. The warping factor is an index to a bank of mel-scale filterbanks, each corresponding to a different amount of frequency transformation.

In an initial recognition pass, the unwarped sequence of feature vectors is scored against the set of recognition unit models. A hypothesized string is generated in step 40 based on the highest score from the probabilistic alignment of the unwarped sequence of feature vectors with the recognition unit models.

The K warped sequences of feature vectors (including one sequence warped with a warping factor of 1.00) are scored by determining the likelihood of the particular warped sequence given the recognition unit models and the hypothesized string in order to make a set of likelihoods. The maximum of the set of likelihoods is selected in step 42, and the warping factor $\alpha$ associated with the warped sequence of feature vectors that scored the maximum likelihood is selected in step 44 as the optimal warping factor, $\hat{\alpha}$. The optimally warped sequence of feature vectors, in which the feature vectors are each warped according to the optimal warping factor (which is associated with a particular one of the bank of mel-scale filterbanks), is generated in step 46.

The model adaptation processor 22 (FIG. 1) receives a sequence of feature vectors 20 as input and affects the HMM parameters stored in the recognition database 12. An exemplary model adaptation technique which can be implemented in the model adaptation processor 22 is illustrated by the flow diagram of FIG. 4. The model adaptation processor performs a maximum likelihood estimation of model adaptation parameter $\gamma$, which is a set of transformations, where $\mu_i' = \mu_i - \gamma$ for all mean vectors.

Figure 4:
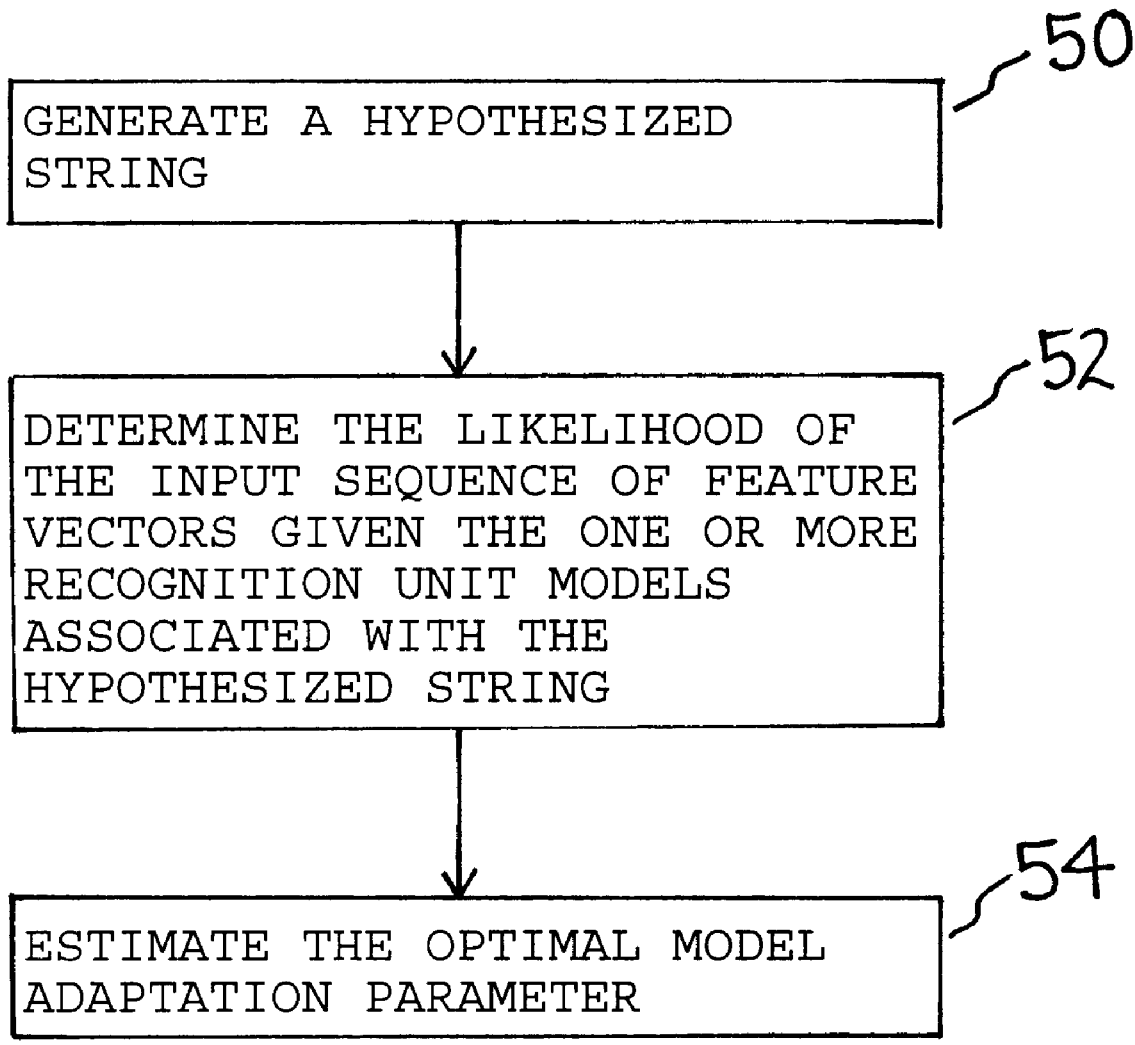
FIG. 4 is a flow diagram for describing model adaptation in accordance with the principles of the invention.

Referring to FIG. 4, in an initial recognition pass the sequence of feature vectors is scored against the recognition unit models to generate in step 50 a hypothesized string, H. The role of the hypothesized string H and the probabilistic alignment is to assign feature vectors $X_{(1)}, X_{(2)}, X_{(3)}, \ldots, X_{(T)}$ to model states $j_{(1)}, j_{(2)}, j_{(3)}, \ldots, j_{(T)}$.

For a set of HMMs having one Gaussian distribution per model state, there will be for each model state an associated mean $\mu_{j(t)}$ and an associated variance $\sigma_{j(t)}$, respectively: $\mu_{j(1)}, \mu_{j(2)}, \mu_{j(3)}, \ldots, \mu_{j(T)}$ and $\sigma_{j(1)}, \sigma_{j(2)}, \sigma_{j(3)}, \ldots, \sigma_{j(T)}$.

The likelihood of the input sequence of feature vectors given the one or more recognition unit models associated with the hypothesized string is determined in step 52. The optimal model adaptation parameter is the one associated with the maximum of the likelihood of the sequence of feature vectors given the one or more recognition unit models associated with the hypothesized string. Assuming that only the highest scoring Gaussian in the mixture contributes to the likelihood computation, the optimal model adaptation parameter is estimated in step 54 according to Eq. 5. The optimal model adaptation parameter defined by Eq. 5 reflects a linear transformation to the means of the model states that are assigned to the input sequence of feature vectors. The linear transformation corresponds to a single linear bias which shifts the means of the model states.

Because of the simplicity of the linear transformation (i.e., a single linear bias) applied to the models, the inverse of such transformation, in the form of a single linear bias, can be applied directly to the input sequence of feature vectors, as discussed previously. Thus, in a specific embodiment of the invention, the optimal model adaptation parameter, $\hat{\gamma}$, is used to adapt the recognition unit models to the unknown input utterance (characterized by the input sequence of feature vectors) by applying the inverse of the transformation corresponding to $\hat{\gamma}$ to the sequence of feature vectors. This inverse transformation is somewhat more easily implemented.

In a second recognition pass, speech is recognized by scoring the linearly biased sequence of feature vectors in a probabilistic alignment with the set of HMMs to generate a recognized speech signal.

Figure 5:
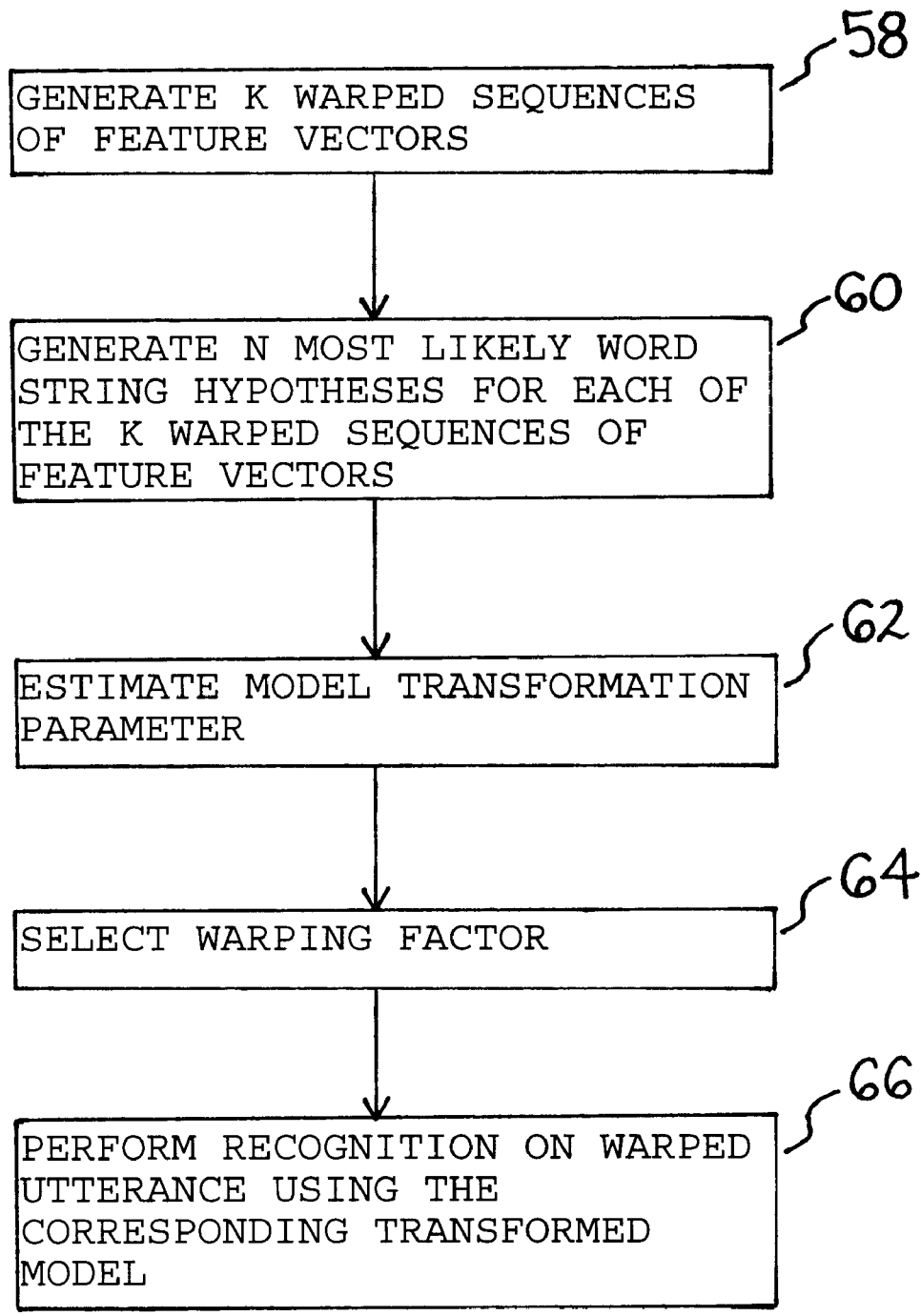
FIG. 5 is a flow diagram for describing a joint optimization process in accordance with the principles of the invention.

FIG. 5 presents a flow diagram for describing joint optimization of the parameters of frequency warping and model adaptation in a maximum likelihood framework in a specific embodiment of the invention. The form of the procedure for simultaneous estimation of spectral warping and spectral shaping functions is dictated largely by the fact that it is sufficient to select an optimal warping function from a relatively small ensemble of possible warping functions. As a result of this fact, a sequence of warped feature vectors $X^{\alpha i}$ can be generated for each warping factor $\alpha_i$ for i=1 to K, and these warped sequences of feature vectors can be used to solve the closed form expression given in Eq. 5 for a corresponding model transformation vector $\hat{\gamma}_i$. The optimal parameters $\{\hat{\alpha}, \hat{\gamma}\}$ are then chosen based on the likelihood of the warped utterance with respect to the most likely transformed model. In obtaining the optimal warping factor and the optimal model adaptation parameter, N-best string candidates are used as an additional ensemble of alternatives that can be searched for finding the optimum parameters $\{\hat{\alpha}, \hat{\gamma}\}$. The procedure for estimating the optimal parameters $\{\hat{\alpha}, \hat{\gamma}\}$ and performing speech recognition is described as follows and with reference to FIG. 5.

(I) Ensemble of Warped Utterances: Given input speech and an ensemble of linear warping factors $\alpha_1, \ldots, \alpha_K$, generate in step 58 a sequence of warped feature vectors corresponding to each warping factor:

$$X^{\alpha 1}, \ldots, X^{\alpha K}. \quad (6)$$

(II) N-best Recognition Hypotheses: Generate in step 60 the N most likely word string hypotheses by performing an initial decoding pass for each of the frequency warped utterances:

$$H^1_i, \ldots, H^N_i, \text{ for } i=1, \ldots, K \tag{7}$$

A conventional N-best string model generator is designed to receive a "best" string model and generate a set of N string models which are highly competitive with the best string model. The N highly competitive string models provide a basis for generating N best strings associated with the N best string models. The N-best string model generator receives hidden Markov model (HMM) parameters from the recognition database and produces a set of string models which are highly competitive with the one or more recognition unit models that best match the input sequence of feature vectors. Determination of the N-best word strings is made through use of DSP implementation of a modified Viterbi decoder. An N-best string model generator that can be used in accordance with the principles of the invention is described in detail in U.S. Pat. No. 5,579,436 issued Nov. 26, 1996 to Chou et al., entitled "RECOGNITION UNIT MODEL TRAINING BASED ON COMPETING WORD AND WORD STRING MODELS", which is incorporated by reference as if fully set forth herein.

(III) Estimate Model Transformation: Given HMM model $\lambda$ and N-best string hypotheses $H^n_i$, for $n=1, \ldots, N$ obtained from each warped sequence of feature vectors $X^{\alpha i}$, compute in step 62 a model transformation vector for each $\alpha_i$:

$$\hat{\gamma}_i \text{ for } i=1, \ldots, K \tag{8}$$

as given by Eq. 5 in order to increase the likelihood $$P(X^{\alpha i}/\alpha_i, \gamma_i, \lambda, H^n_i) \text{ for } i=1, \ldots, K \tag{9}$$

(IV) Select Warping Factor: Given $\hat{\gamma}_i$ obtained for each $\alpha_i$, $i=1, \ldots, K$ compute in step 64

$$\{\hat{\alpha}, \hat{\gamma}\} = \arg\max_i P(X^{\alpha i}/\alpha_i, \hat{\gamma}_i, \lambda, H^n_i) \tag{10}$$

(V) Recognition: Perform recognition in a final recognition pass on the optimally warped sequence of feature vectors $X^{\hat{\alpha}}$ using the corresponding optimally transformed models $h_{\hat{\gamma}}(X)$ in step 66.

Single utterance-based adaptation experiments were performed on a connected digit speech corpus that was collected over the public switched telephone network. The training corpus (i.e., known utterances used to make the recognition unit models) consisted of 8802 single to seven digit utterances (a total of 26717 digits), and the test corpus (i.e., unknown utterances to be recognized according to the principles of the invention) contained 4304 utterances (13185 digits) from 242 male and 354 female speakers. Context-independent continuous hidden Markov digit models with mixtures of eight Gaussians per state were used in an exemplary speech recognition system in accordance with the principles of the invention. Speaker adaptation results are displayed in TABLE 1 in terms of the percentage of digits that were erroneously recognized by such exemplary speech recognition system.

TABLE 1

| ADAPTATION METHOD | DATA ERROR |
| --- | --- |
| Baseline | 3.4% |
| Baseline + Warp Trained | 2.9% |
| Warp | 2.5% |
| Bias | 2.5% |
| Warp + Bias | 2.2% |
| N-Best + Warp + Bias | 2.1% |

Referring to TABLE 1, the "Baseline" digit accuracy is shown in the first row. The second baseline experiment, labeled "Baseline+Warp Trained", refers to the improved acoustic models obtained by applying frequency warping during training. In such training procedure, first the optimum linear frequency warping factor $\hat{\alpha}$ was estimated for each speaker in the training set so that $P(X^{\alpha}|\alpha,\lambda,H_c)$ was maximized, where $H_c$ is the known transcription (of the speaker's utterances) corresponding to X. Then, improved state alignment was obtained using the warped feature vectors $X^{\hat{\alpha}}$. Finally, HMM models were trained from the original (unwarped) utterances X using the segmentation information obtained from the warped utterances. A 15% reduction in word recognition error rate for the test set was achieved by using warping during training. The "Warp Trained" HMMs are used for the remainder of the adaptation experiments reported in TABLE 1.

In the speech recognition system taught herein, the recognition unit models preferably comprise one or more hidden Markov models (HMMs). The HMMs are trained before testing (i.e., before actual speech recognition in the field). Any conventional training technique to make the set of HMMs can be used in accordance with the principles of the invention. Such training can be iterative and/or discriminative. Recognition unit model training is described in detail in U.S. Pat. No. 5,579,436 issued Nov. 26, 1996 to Chou et al., entitled "RECOGNITION UNIT MODEL TRAINING BASED ON COMPETING WORD AND WORD STRING MODELS", previously incorporated by reference herein.

Next, TABLE 1 shows the performance of the speaker adaptation techniques outlined previously when a single utterance is used to estimate the transformation parameters. In the third row of TABLE 1, "Warp", refers to frequency warping such as described previously, in which the amount of linear frequency scaling ranges from 12% compression to 12% expansion and a total of 13 warping factors are used within this range. The fourth row of TABLE 1, "Bias", displays the recognition rate when a single linear bias is estimated for the whole utterance without the use of frequency warping. The optimal bias vector $\gamma$ maximizes $P(h_\gamma(x)|\gamma,\lambda,H)$, where H is the corresponding transcription (i.e., hypothesis string) obtained from a preliminary decoding pass.

The fifth row of Table 1, labeled "Warp+Bias", refers to frequency warping and linear bias estimation applied in cascade according to the principles of the invention. A separate bias vector $\gamma_\alpha$ was computed and subtracted from each warped observation sequence $X^\alpha$ before the optimal warping index $\hat{\alpha}$ was selected as taught herein. Joint optimization of the bias vector and the warping index provides additional performance improvement of the speech recognition system compared to separately optimizing the bias vector and the warping index. The combined optimization of both model transformation and frequency warping is thus shown to obtain a better match between unknown speech utterances and the recognition unit models.

The last row in TABLE 1 labeled "N-Best+Warp+Bias", shows the performance of the combined procedure illustrated by FIG. 5 using the N-best string model generator, in which warping and bias estimation were applied to the top four scoring transcriptions (i.e., the four best hypothesis strings). This form of the combined procedure provides a larger ensemble of models as "starting points" for adaptation, whereby the word recognition error rate can be reduced by approximately 30%. Most of the improvement is due to the combination of the frequency warping and bias adaptation techniques, while some improvement is due to using N-best alternate hypotheses in the process of estimating the transformation parameters. The reduction in error rate obtained by combining frequency warping and spectral shaping in a single process is approximately equal to the sum of the reduction in speech recognition error rates when applying each of the adaptation procedures separately.

While several particular forms of the invention have been illustrated and described, it will also be apparent that various modifications can be made without departing from the spirit and scope of the invention.

What is claimed is:

1. A signal processing method for recognizing unknown speech signals, comprising the following steps:

(A) receiving an unknown speech signal;

(B) generating a frequency warped sequence of feature vectors characterizing the unknown speech signal;

(C) simultaneously adapting a set of recognition unit models to the unknown speech signal using a linear transformation while generating said frequency warped sequence of feature vectors; and (D) recognizing the unknown speech signal based on said frequency warped sequence of feature vectors and the set of adapted recognition unit models.

2. A method as defined in claim 1, wherein:

the set of recognition unit models comprising one or more hidden Markov models.

3. A method as defined in claim 1, further comprising the step of:

providing a memory means for storing the set of recognition unit models and a matrix of recognition unit model parameters, wherein each recognition unit model including one or more Gaussian distributions, each of the one or more Gaussian distributions having a mean and a variance, and the matrix of recognition unit model parameters comprising the mean and the variance of each Gaussian distribution.

4. A method as defined in claim 3, wherein step (C) comprises the steps of:

determining a hypothesized string based on a probabalistic alignment of said frequency warped sequence of feature vectors with respect to the set of recognition unit models; and determining a linear model adaptation parameter based on said frequency warped sequence of feature vectors and the mean and the variance of a Gaussian distribution of a recognition unit model associated with the hypothesized string.

5. A method as defined in claim 4, wherein step (C) further comprises the step of:

shifting the mean of each Gaussian distribution in the set of recognition unit models based on said linear model adaptation parameter.

6. A method as defined in claim 3, wherein step (C) comprises the step of:

adjusting one or more recognition unit model parameters.

7. A method as defined in claim 1, wherein step (B) comprises the step of:

providing a bank of mel-scale filterbanks, wherein each of the bank of mel-scale filterbanks having a particular spacing and bandwidth of the filters within the mel-scale filterbank corresponding to an amount of frequency transformation and being associated with a particular warping factor, and at least one of the bank of mel-scale filterbanks corresponding to no frequency transformation and being associated with a warping factor of one.

8. A method as defined in claim 7, wherein step (B) further comprises the steps of:

determining an unwarped sequence of feature vectors using the at least one mel-scale filterbank corresponding to no frequency transformation and being associated with a warping factor of one;

determining a hypothesized string based on a probabilistic alignment of the unwarped sequence of feature vectors with respect to the set of recognition unit models;

determining one or more frequency warped sequences of feature vectors, the feature vectors of each said frequency warped sequence being warped according to a different warping factor;

determining, for each of said one or more frequency warped sequences of feature vectors, the likelihood of said frequency warped sequence of feature vectors with respect to one or more recognition unit models associated with the hypothesized string to make a set of likelihoods;

determining the maximum of the set of likelihoods;

selecting an optimal frequency warping factor based on the maximum of the set of likelihoods; and identifying, based on said optimal frequency warping factor, the frequency warped sequence of feature vectors characterizing the unknown speech signal.

9. A signal processing method for recognizing unknown speech signals, comprising the following steps:

(A) receiving an unknown speech signal;

(B) generating a frequency warped sequence of feature vectors characterizing the unknown speech signal;

(C) applying a linear transformation to said frequency warped sequence of feature vectors;

(D) jointly optimizing generating said frequency warped sequence of feature vectors and applying the linear transformation; and (E) recognizing the unknown speech signal based on the linearly transformed frequency warped sequence of feature vectors and a set of recognition unit models.

10. A method as defined in claim 9, wherein:

the set of recognition unit models comprising one or more hidden Markov models.

11. A method as defined in claim 9, wherein step (B) comprises the step of:

providing a bank of mel-scale filterbanks, wherein each of the bank of mel-scale filterbanks having a particular spacing and bandwidth of the filters within the mel-scale filterbank corresponding to an amount of frequency transformation and being associated with a particular warping factor, and at least one of the bank of mel-scale filterbanks corresponding to no frequency transformation and being associated with a warping factor of one.

12. A method as defined in claim 9, further comprising the step of:

providing a memory means for storing the set of recognition unit models and a matrix of recognition unit model parameters, wherein each recognition unit model including one or more Gaussian distributions, each of the one or more Gaussian distributions having a mean and a variance, and the matrix of recognition unit model parameters comprising the mean and the variance of each Gaussian distribution.

13. A method as defined in claim 12, wherein step (C) comprises the steps of:

determining a hypothesized string based on a probabalistic alignment of said frequency warped sequence of feature vectors with respect to the set of recognition unit models;

determining a model adaptation parameter based on said frequency warped sequence of feature vectors and the mean and the variance of a Gaussian distribution of a recognition unit model associated with the hypothesized string; wherein the linear transformation being based on the model adaptation parameter.

14. A speech recognition system, comprising:

an acoustic transducer capable of receiving sound waves representing unknown speech and converting the sound waves into an electrical unknown speech signal;

a feature extractor coupled to the acoustic transducer, wherein the feature extractor generating a frequency warped sequence of feature vectors based on the unknown speech signal, the feature vectors of said frequency warped sequence being warped according to a warping factor;

a memory means for storing a set of recognition unit models;

a model adaptation processor coupled to the feature extractor and the memory means, wherein the model adaptation processor simultaneously adapting the set of recognition unit models to the unknown speech signal using a linear transformation based on said frequency warped sequence of feature vectors while said frequency warped sequence of feature vectors is generated; and a recognizer coupled to the feature extractor and the memory means, wherein the recognizer recognizing the unknown speech signal based on said frequency warped sequence of feature vectors and the set of adapted recognition unit models.

15. A system as defined in claim 14, wherein:

the set of recognition unit models comprising one or more hidden Markov models.

16. A system as defined in claim 14, wherein:

the feature extractor including a bank of mel-scale filterbanks, each of the bank of mel-scale filterbanks having a particular spacing and bandwidth of the filters within the mel-scale filterbank corresponding to an amount of frequency transformation and being associated with a particular warping factor, at least one of the bank of mel-scale filterbanks corresponding to no frequency transformation and being associated with a warping factor of one.

17. A system as defined in claim 16, wherein:

the feature extractor operating to determine an unwarped sequence of feature vectors, which characterizes the unknown speech signal, using the at least one mel-scale filterbank corresponding to no frequency transformation and being associated with a warping factor of one, determine a hypothesized string based on a probabalistic alignment of the unwarped sequence of feature vectors with respect to the set of recognition unit models, determine one or more frequency warped sequences of feature vectors, each being warped according to a different warping factor, characterizing the unknown speech signal, determine, for each of said one or more frequency warped sequences of feature vectors, the likelihood of said frequency warped sequence of feature vectors with respect to one or more recognition unit models associated with the hypothesized string to make a set of likelihoods, determine the maximum of the set of likelihoods, select optimal frequency warping factor based on the maximum of the set of likelihoods, and identify, based on said optimal frequency warping factor, the frequency warped sequence of feature vectors characterizing the unknown speech signal.

18. A system as defined in claim 14, wherein:

each recognition unit model including one or more Gaussian distributions, each of the one or more Gaussian distributions having a mean and a variance, and further comprising a matrix of recognition unit model parameters comprising the mean and the variance of each Gaussian distribution.

19. A system as defined in claim 18, wherein:

the model adaptation processor operating to determine a hypothesized string based on a probabalistic alignment of said frequency warped sequence of feature vectors with respect to the set of recognition unit models, and determine a linear model adaptation parameter based on said frequency warped sequence of feature vectors and the mean and the variance of a Gaussian distribution of a recognition unit model associated with the hypothesized string.

20. A system as defined in claim 19, wherein:

said linear model adaptation parameter corresponds to a shift in the mean of each Gaussian distribution in the set of recognition unit models.

* * * * *